UNITED STATES PATENT OFFICE.

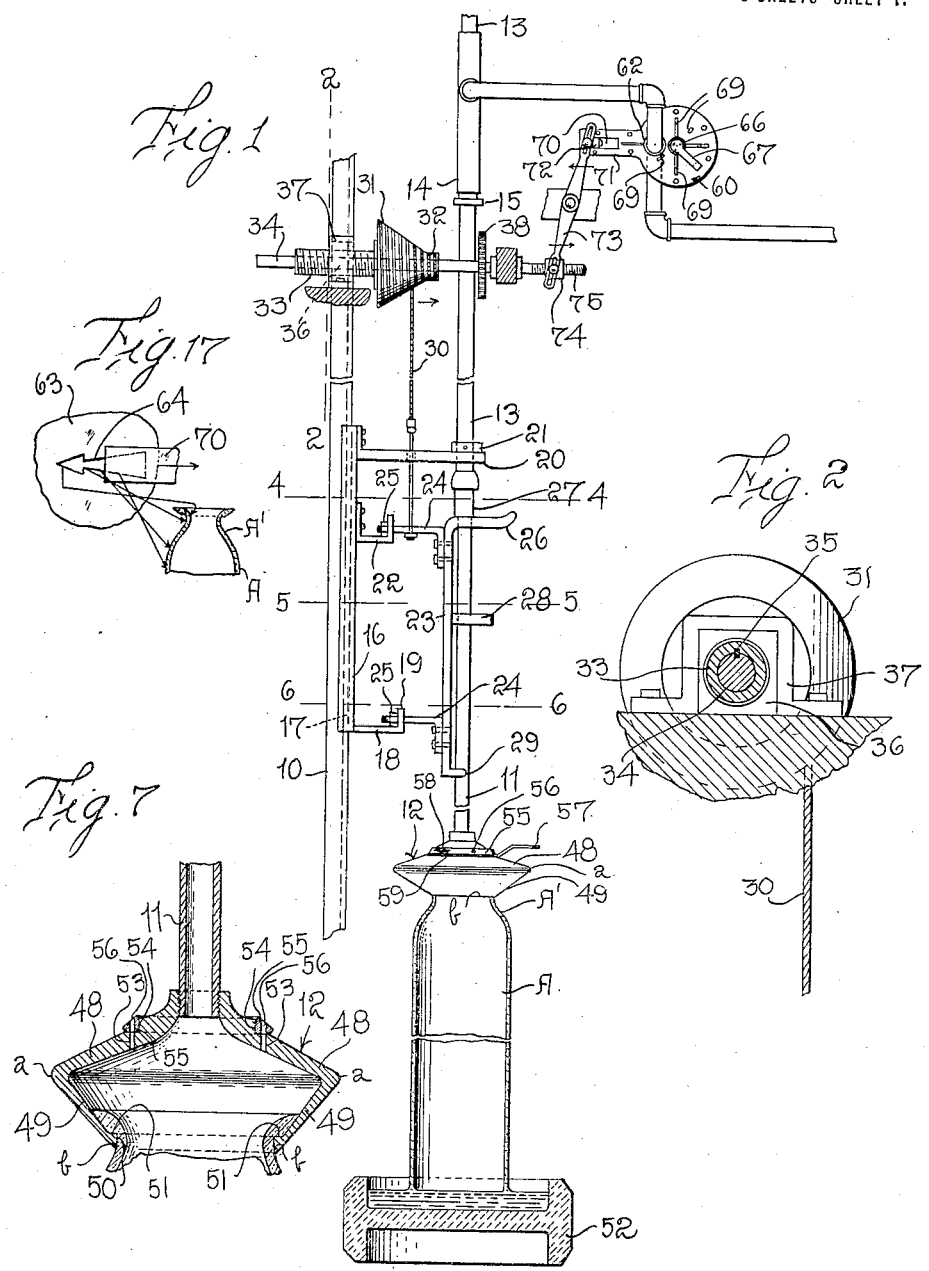

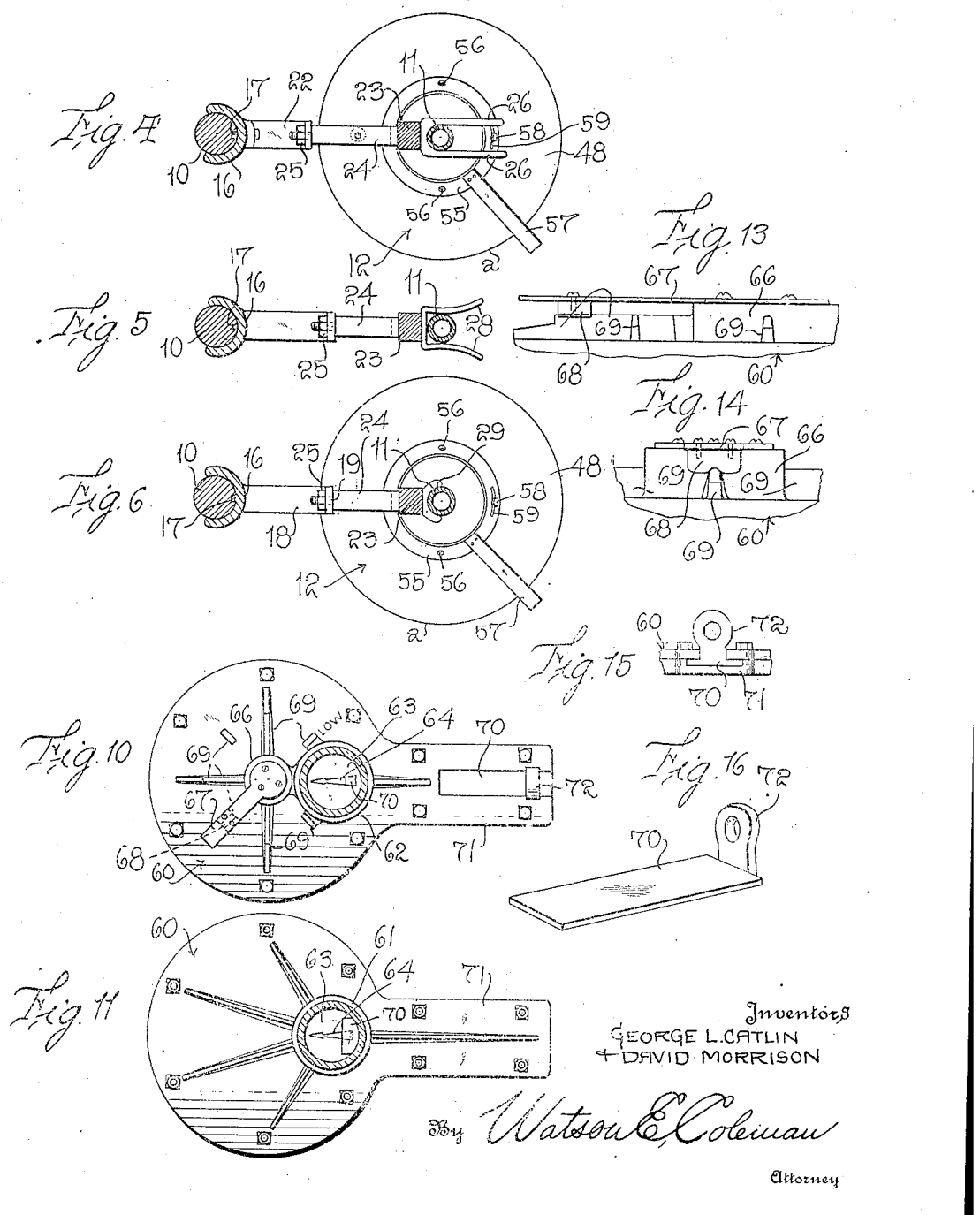

GEORGE L. CATLIN AND DAVID MORRISON, OF PORT ALLEGANY, PENNSYLVANIA, ASSIGNORS TO R. W. HILTON, OF SMETHPORT, PENNSYLVANIA.

GLASS-DRAWING APPARATUS.

1,351,833.      Specification of Letters Patent.      Patented Sept. 7, 1920.

Application filed October 29, 1917. Serial No. 199,039.

*To all whom it may concern:*

Be it known that we, GEORGE L. CATLIN and DAVID MORRISON, citizens of the United States, residing at Port Allegany, in the county of McKean and State of Pennsylvania, have invented certain new and useful Improvements in Glass-Drawing Apparatus, of which the following is a specification, reference being had to the accompanying drawings.

This invention relates to glass drawing furnaces, and particularly to the bait, the means for lifting the bait, and the means for controlling the volume and pressure of air in the bait.

One object of this invention is to provide a bait of a peculiar form so designed that it will not obstruct observation of the point at which the bait touches the surface of the glass as the bait merges from the glass, to thus permit the workman to observe the condition of the glass as it is initially drawn upward from the pot.

A further object of the invention is to so construct the bait that the novel will have a better engagement with the bait than is ordinarily the case.

Still a further object of the invention is to provide means for controlling the pressure of the air within the bait and, therefore, the pressure within the cylinder of glass drawn by the bait, this means comprising a valve on the bait itself, so arranged as to permit the escape of air from the bait and thus reduce excess pressure, thus preventing those fluctuations of pressure which will make the glass thick and thin in places and which will cause the cylinder to be bulged outward at different points in its length, this valve being under the control of the workman.

A further object is to provide in combination with means for controlling the pressure of air in the bait and in the cylinder, means arranged to control the volume of air passing into the bait pipe, this controlling means being adapted for regulation according to atmospheric conditions and the quality or characteristics of the batch of glass being treated.

A further object is to provide a volume controlling valve having a series of apertures of different sizes, which are adapted to be shifted into alinement with the bait pipe or tube.

And another object is to so form or shape these apertures that they will automatically regulate the volume of air delivered in accordance with the various steps in the drawing of the cylinder, and in this connection to provide a valve coacting with an aperture so arranged as to uncover a relatively small portion of the aperture, when the bait is first drawn from the pot, then gradually increase the size of the aperture automatically as the bait is farther withdrawn from the pot to form the neck of the cylinder, then reduce the volume of air passing into the bait pipe and cylinder when the neck has been formed, and then gradually increase the volume of air delivered as the cylinder is drawn from the pot and as the glass, of which the cylinder is formed, gradually grows harder.

A further object of the invention is to provide an improved form of cage or carriage for supporting the bait pipe and provide a winding drum which is shiftable above the carriage to thereby cause the cable connecting the carriage to the winding drum to be centered at all times.

Still another object in this connection is to provide means whereby the volume controlling valve shall be actuated in accordance with the movement of the winding drum and, therefore, in accordance with the degree to which the bait is lifted from the pot and the corresponding length of the cylinder.

A further object is to provide a carriage which will be firmly guided in its upward movement, without any tendency to rock, to thus cause the glass cylinder to be drawn evenly and prevent any oscillation of the bait pipe which would tend to cause the walls of the cylinder to become sinuous.

Other objects will appear in the course of the following description.

Our invention is illustrated in the accompanying drawings, wherein:—

Figure 1 is a side elevation of a glass drawing apparatus constructed in accordance with our invention;

Fig. 2 is a fragmentary section on the line 2—2 of Fig. 1;

Fig. 3 is a fragmentary top plan view of the drum, the drum shaft and the gears for driving the drum;

Fig. 4 is a section on the line 4—4 of Fig. 1;

Fig. 5 is a section on the line 5—5 of Fig. 1;

Fig. 6 is a section on the line 6—6 of Fig. 1;

Fig. 7 is a vertical diametrical section of the bait and a portion of the bait tube, on line 7—7 of Fig. 9;

Fig. 8 is an under side plan view of the bait;

Fig. 9 is a top plan view of the bait, the bait tube being in section;

Fig. 10 is a front elevation of the valve casing for controlling the volume of air admitted to the bait, the air delivery pipe being in section;

Fig. 11 is a rear elevation of the valve casing shown in Fig. 10, the air delivery pipe being in section;

Fig. 12 is a plan view of the disk 63;

Fig. 13 is a fragmentary elevation of the front section of the valve casing 60;

Fig. 14 is a fragmentary elevation of the valve casing 60, the view being at right angles to the point of view in Fig. 13;

Fig. 15 is a fragmentary elevation of the valve casing and an end elevation of the slide 70;

Fig. 16 is a perspective view of the slide 70; and

Fig. 17 is a diagrammatic view showing the relation of the different parts of an aperture 64 to the cylinder as it is blown.

Referring to the drawings, and particularly to Fig. 1, 10 designates a vertical guide bar supported in any suitable or usual manner, and 11 designates the lowest section of the bait pipe, which carries the bait 12, this section 11 being detachably or flexibly joined to a section 13, which in turn has telescopic engagement with an outer section 14, there being a stuffing box 15 on the section 14, which prevents the escape of air between the sections 13 and 14. The section 13 is approximately about 40 feet long and the section 14 is about 40 feet long. The bait 12, therefore, has a vertical travel of about 40 feet.

For the purpose of supporting the bait pipe, we provide a carriage, which comprises a vertically disposed bar 16, which on its inside face is formed with an approximately semi-circular groove embracing the circular rod 10 and having sliding engagement therewith. The rod 10 is formed with a groove extending longitudinally throughout its length and the slide 16 is formed with a feather or spline 17 engaging in this groove and preventing any lateral movement of the bar 16 while permitting it to move vertically for the entire length of the guide bar 10. The lower end of the slide 16 has an inwardly extending member 18 formed with an upwardly extending apertured ear 19, and the upper end of the slide 16 has attached to it the outwardly projecting bar 20, which is apertured at its end to receive the lower end of the pipe section 13. A shoulder 21 on the pipe section 13 rests upon this bar 20, so as to prevent the pipe section 13 from dropping down. Attached to the slide 16, adjacent to the bar 20, is the angle iron 22, which has an upturned perforated extremity. Disposed parallel to the bait pipe section 11, is a vertical bar or rod 23, to the upper end of which is riveted a bolt 24, having its outer end angularly bent to engage with the bar 23, this bolt passing through a perforation in the upturned end of the angle iron 22 and being provided with a nut 25. The lower end of the bar 23 is also provided with an angular bolt 24 which extends through the perforation in the end of the member 18 and is provided with a nut 25. Thus the bar 23 may be adjusted. The bar 23 at its upper end, as illustrated in Fig. 4, is provided with the outwardly extending spaced fingers 26, between which the pipe section 11 is received, there being a shoulder 27 on the upper end of the pipe section 11, which rests upon these fingers. Below the fingers 26, the bar 23 is provided with the fork 28, the fingers of this fork being resilient and resiliently binding against the pipe section 11. The lower end of the bar 23 is formed with a concave recess 29, against which the lower end of the pipe section 11 bears.

For the purpose of raising and lowering the carriage, we attach to the carriage a cable 30, which extends up and around a drum 31, this drum, as illustrated in Figs. 1 and 3 being tapered for the greater portion of its length and then being provided with a cylindrical portion 32. This drum has a hub 33 which is exteriorly screw-threaded. Passing through the drum is a shaft 34 and the drum is splined to this shaft by means of a feather 35 which extends for a predetermined distance on the shaft. Thus, it will be seen that the drum, with its hub 33, may move longitudinally along the shaft 34 while rotating therewith. Coacting with the screw-threads on the exterior face of the hub 33 is a fixed nut 36, as illustrated in Fig. 2, this nut being interiorly screw-threaded, and the nut being held from rotation in any suitable manner, as by means of the box 37.

It will be obvious now that a rotation of the shaft 34 in one direction will cause a rotation of the drum, and coincidently a movement of the drum longitudinally along the shaft, and that a rotation of the shaft 34 in the opposite direction will cause a rotation of the drum along the shaft in the opposite direction.

For the purpose of rotating the shaft 34, we mount upon the shaft a gear wheel 38 engaged by a pinion 39 on a countershaft 40, this shaft carrying a gear wheel 41 meshing with the pinion 42, this pinion carrying a clutch member 43. Passing through the pinion 42 is a shaft 44 which carries a clutch member 45 coacting with the clutch member 43, and mounted upon the shaft 44 is a worm wheel 46 driven by means of a worm 47. This worm in turn is driven by any suitable gearing from any suitable source of power. When the clutch member 45 is engaged with the clutch member 43, the shaft 34 will be driven positively from the worm 47. When the clutch 45 is shifted out of engagement with the clutch 43, then the shaft is disconnected from the power. Any suitable means may be used to shift the clutch 45 and this means is within the control of the operator who is drawing the cylinder from the pot. Ordinarily electrical clutch shifting means are used and inasmuch as these are old and well known, we have not illustrated any clutch shifting means.

It will be seen that when power is applied to the shaft 34, the shaft will be rotated in a direction to cause the drum 31 to wind up the cable 30. Initially, and when the bait is in its lowered position, the cable will be wound up upon the small portion of the drum, and then as the bait rises, the cable will be wound upon the largest portion of the drum and the bait will move upward more rapidly than it originally does. This is usual in glass drawing plants, but one of the features of our invention consists in the means above described, whereby the drum is shifted in the direction of the arrow, Fig. 1, in accordance with the winding up of the cable 30. By shifting the drum 31, in the direction of the arrow, Fig. 1, the point at which the cable 30 first engages the drum, is always disposed in alinement with the center of the carriage and thus there is no lateral pull upon the carriage. Where the drum is at all times disposed in the position shown in Fig. 1, and does not shift longitudinally, then as the carriage is first raised, the cable is disposed upward and toward the right or the small end of the drum. Then when the carriage has reached approximately its halfway point in its travel, the cable will be disposed vertically, but as more cable is wound upon the drum and the carriage moves farther up, the cable will be disposed again at an inclination upward and toward the left in Fig. 1. This tends to cause the carriage to bind in its upward movement, prevents the carriage moving evenly and steadily and tends to cause the carriage to fluctuate in its movement and this fluctuation being communicated to the bait prevents the drawing of an even cylinder of glass.

The bait 12, which is illustrated in detail in Fig. 7, has a peculiar form which we have found to be particularly effective. The bait is hollow, relatively shallow and the greatest diameter of the bait is disposed above the lower open end thereof. In other words, the wall of the bait extends downward and outward as at 48, and then extends inward and downward as at 49. This inwardly and downwardly extending portion 49 defines at its lower end a circular opening 50. The outer face of this portion 49 is flat, that is, it is not outwardly convex, but extends straight downward and inward from the point $a$ in Fig. 7 to the point $b$ in Fig. 7. The portion 49 at the opening 50 is about $\frac{1}{4}''$ thick and inward of this opening 50 the inner surface 49 is formed to provide an annular shoulder 51, which extends horizontally inward from the opening 50. The inner surface of the portion 49 above this shoulder 51 extends straight upward and outward, that is, it is relatively flat. This shoulder 51 forms the means whereby the glass will hold on the bait and whereby the glass will be prevented from slipping back off of the bait, as the bait is drawn out of the pot. If it were not for this shoulder 51, the glass would not engage with the portion 49 of the bait sufficiently to permit the bait to draw a cylinder of glass from the pot. The angle of the outer face of the portion 49 is such, however, that the operator, when the bait has been lowered into the pot 52, can see the point $b$, that is, the point of contact between the glass and the lower edge of the portion 49, and thus see the condition of the glass as the bait is withdrawn and the thickness of the wall of the cylinder, and can thus regulate the pressure of air within the novel in accordance with the circumstances of any particular case.

It is to be particularly noted from Fig. 7 that the wall which defines the central lower opening of the bait extends vertically downward, in other words, is concentric with the vertical axis of the bait, and that the outer face of the portion 49 of the bait extends straight downward and inward until it intersects the inner face of the wall defining the lower bait opening so that a sharp annular edge $b$ is formed at the lower end of the bait, thus permitting the bait to enter the molten glass easily and without causing waves in the molten glass. If the bait is formed with a relatively flat annular bottom end having an appreciable width, waves are set up in the molten glass which will tend to cause the cylinder of glass to have thick and thin portions, when the glass is drawn. It is likewise pointed out that the sets of perforations 53 in the upper wall of the bait are disposed uniformly from each other, so that a uniform escape of air or relief of air from the bait is provided for.

Practical use has shown that this particular form of bait is of great importance, as by providing the shoulder 51 it is possible to give the wall 49 an angle which will permit of observation of the point $b$, and this does away with the necessity of forming the wall 49 with a downwardly convex contour. Such a downwardly convex contour tends to prevent the observation of the point $b$ when the bait is inserted in the pot 52.

For the purpose of regulating the pressure within the bait, we form the upper wall of the bait, as illustrated in Figs. 7 and 8, with a plurality of sets of pressure outlet openings 53, each set consisting of a series of openings gradually decreasing in diameter from one end of the set to the other. Mounted in an annular seat 54 is an annulus 55 constituting a valve, this annulus, as illustrated in Fig. 9, being formed with perforations 56, which are adapted to register with the perforations 53, as the annulus is rotated. This annulus is provided with an actuating handle 57 and for the purpose of holding the annulus upon the bait and holding the annulus upon its seat, we provide the bait with the upwardly projecting headed bolts 58, which pass through arcuate slots 59 formed in the annulus. The slots 59 limit the rotation of the annular valve. It will be obvious now that when the valve is shifted to one position, the largest of the openings 53 will be in coincidence with the openings 56 and that as the valve is shifted in one direction, the openings 56 will come into alinement with the smaller orifice 53 or that the openings 56 may be carried beyond any of the orifices 53 so as to prevent entirely any escape of pressure from the interior of the bait. By means of this valve, it is possible to regulate the pressure within the bait and within the cylinder, not by attempting to control the pressure of the air as it enters the bait but by permitting the escape of air, thus reducing the actual effective pressure within the bait and cylinder. Where only one relief perforation or set of perforations is provided, the relief of air from the interior of the bait is not uniform and this again will prevent the even drawing of the cylinder and will cause thick and thin places within the cylinder.

For controlling the volume of air entering the cylinder, we provide means which are automatically actuated, this means being illustrated in Figs. 10 to 12. This controlling means comprises a casing, designated generally 60, and formed in two sections, these sections being bolted to each other. One of these sections is provided with a port defined by an outstanding nipple 61, and the other section has a port defined by an outstanding nipple 62, these nipples being screw-threaded. Disposed between these sections and having air-tight engagement therein is a disk 63, this disk being formed, as illustrated in Fig. 12, with a plurality of apertures 64. These apertures are preferably arrow-shaped, the heads of the arrows extending inward toward the shaft 65, upon which the disk 63 is mounted. The shaft 65 extends out through a suitable bearing 66 formed in one of the sections of the casing and is provided with a handle 67, whereby the valve disk may be rotated. This handle 67 is slightly resilient and on its extremity carries a detent 68 formed with a medial notch. This notch is adapted to engage with a series of ribs and lugs 69 formed upon the face of the valve casing and designed to hold the valve with any one of its apertures 64 in register with the nipples 61 and 62.

Coacting with the rotatable and adjustable disk 63 is a sliding valve 70. This valve operates within a radially extending guide 71 formed on the casing 60, this guide being T-shaped in cross section and the valve having laterally projecting flanges which engage in the T-shaped guide. This valve is adapted to be shifted across the face of the disk 63, so as to cover or uncover the apertures 64, and means are provided whereby the valve 70 will gradually uncover the aperture 64, which is at the time in coincidence with the nipples 61 and 62.

The means for automatically shifting this valve are illustrated in Fig. 1. The extremity of the valve is formed with an angularly disposed lug 72 which is apertured and connected to this apertured lug is a lever 73, which is pivoted at its middle. The other end of this lever is engaged by a nut 74, this nut being interiorly screw-threaded and engaging with the screw-threaded portion 75 of the shaft 34. The screw-threads 75 are so directed that as the drum 31 rotates in a direction to wind up the cable 30, the valve 70 will be shifted toward a position to fully open the aperture 64, which the valve is controlling, and this shifting movement of the valve 70 is so regulated by the screw-threads 75 that at the beginning of the operation of drawing the cylinder, the valve will uncover the apex of the arrow-headed aperture 64 and that while the neck A' of the cylinder A is being formed, the head of the arrow will be gradually uncovered and that when the neck of the cylinder A has been entirely formed, the valve will have arrived at a point coincident with the junction between the head and the shaft of the arrow. It will be noted from Fig. 17 that the shaft of each arrow-shaped aperture expands outward. Now as the cylinder A is drawn from the pot 52, the valve 70 is shifted outward along the shaft of the arrow-shaped aperture and as this shaft of the aperture gradually widens, an increased amount of air under pressure will be allowed to flow through the bait into the cylinder A, this increased amount being necessary not only because of the increase in the length of the cylinder but also because of the decreasing temperature of the glass and its consequent resistance to air pressure.

It will be seen that the valve in the casing 60 controls the volume of air delivered to the bait pipe and controls this volume automatically in coincidence with the drawing of the cylinder, the volume of air increasing as the length of the cylinder increases. It will further be seen that the pressure of the air is controlled by the workman through the operation of the annular valve 55 so that the workman who is in a position to see exactly what pressure the glass requires can control this pressure. The valve disk 63 is controlled by the superintendent or foreman and this valve disk 63 is adjusted to suit the circumstances of any particular operation. Thus, for instance, climatic conditions control the character of the batch of glass and the ingredients of the batch as understood by practical glass makers, and the disk 63 will be set in accordance with these climatic conditions. The climatic conditions, such as difference in temperature and humidity as before stated, control the ingredients of any particular batch of glass, and the ingredients of the batch determine the fluidity of the molten glass and its resistance or lack of resistance to the drawing operation and, therefore, determine the volume of air which is necessary to secure a proper pressure within the cylinder as it is being drawn. Changes in temperature also control the setting of the valve disk 63. The higher the temperature, the smaller will be the opening 64 controlling the flow of compressed air to the bait pipe for the reason that the higher the temperature the softer will be the glass. The softer the glass, the smaller must be the opening which controls the passage of air to the bait pipe and, of course, the ingredients of which the glass is composed also control its hardness or softness. The valve casing 60 is connected by one of the nipples 61 to a source of air under pressure, while the pipe 76 extends from the other nipple and enters the lower end of the pipe section 14.

The general operation of this invention will be obvious to all who are acquainted with the art of drawing glass. When the clutch 45 is released, the weight of the bait and of the bait tube draws down the carriage and rotates the drum in a reverse direction so as to permit the bait to be carried a sufficient distance into the pot 52. The clutch 45 is then thrown in and the drum 31 commences to rotate, drawing the carriage up relatively slowly. The layer of glass clings to the inside face of the bait and particularly to the ledge or shoulder 51. At this time the slide 70 has opened the smallest portion of the arrow-shaped opening 64 and then as the neck A' is formed on the upper end of the cylinder A, the head of the arrow-shaped opening is gradually disclosed by the valve and more air is allowed to enter the cylinder A so as to cause the glass to expand to form the neck A' or upper end of the cylinder. When the neck has been formed, the slide valve 70 has arrived at the junction of the head of the arrow-shaped opening with the shaft of the arrow-shaped opening and the rate of increase in pressure is reduced as no more diametrical expansion of the cylinder is needed and then as the bait continues to rise, the slide is gradually shifted along the shaft of the opening 64, so as to increase the volume of air entering the cylinder A in proportion to the lengthening of the cylinder. This does away with the necessity of the workman himself controlling the volume of air entering the cylinder and eliminates the necessity of having a very experienced workman control the drawing of the glass, it being only necessary that the workman control the pressure within the bait by controlling the valve 55. This pressure may be increased or reduced at any time by the workman or may be gradually reduced as the cylinder lengthens or increased as the cylinder lengthens, whichever may be desirable. When the cylinder has been fully drawn from the pot, the cylinder is detached from the glass in the pot in the usual manner and swung to a horizontal position and laid upon trestles, detached from the bait and cut up into relatively short sections in the usual manner. The lower section 11 of the bait tube is then swung back into position within the clip 28 and the weight of the bait tube and bait again reversely rotates the drum and brings the parts back to their initial positions, this reverse rotation of the drum and of the shaft 34 acting to shift the slide valve 70 to close the aperture 64.

Attention is again called to the detailed construction of the bait. It is to be noted that the angle of the outer and inner surfaces of the lower wall of the bait is greater with reference to a horizontal plane than the critical angle of friction so that, as a consequence, when the bait is dipped into the pot and withdrawn therefrom, the molten glass will not adhere to the exterior face of the lower wall of the bait and this molten glass would not adhere to the inner face were it not for the ledge which is formed at the lower end of the inner surface. This ledge prevents the glass which is to form the novel from slipping down the inner surface of the bait. The inclination of this wall is, as before stated, greater than the critical angle of friction and thus prevents the adherence of the glass to the exterior face of the bait and this angle is also required in order that the point of contact between the bait and the glass may not be obscured when the bait is inserted in the pot with its lower edge in contact with the surface of the glass. It is to be noted in this connection also that, as before stated, the outer surface extends downward and inward in an unbroken approximately straight line from the point $a$ to the point $b$ and that this point $b$ is coincident with the relatively sharp edge formed at the junction of the surface 49 with the upwardly extending edge of the wall defining the lower opening and that there is no relatively wide edge face which bears against the surface of the glass or is parallel thereto.

Having described our invention, what we claim is:—

1. A glass drawing apparatus, including a bait and a bait tube, means for supplying air to the bait tube, means permitting a relatively small volume of air to pass into the bait tube when the bait is initially lifted from the molten glass and gradually increasing the volume of air so supplied in proportion as the bait is lifted from the glass to form the neck of the cylinder, and suddenly decreasing the rate of increase of said volume of air at the point where the bait tube has been lifted to complete the neck and then gradually increasing the rate of increase of the volume of air supplied as the bait moves upward to form a glass cylinder of uniform diameter, and means for lifting the bait at a uniform speed during the period in which the neck of the cylinder is formed and completed, and then gradually and uniformly increasing the speed of the upward movement of the bait, in proportion to the rate of increase of the supply of air secured while the body of the cylinder is being formed.

2. A glass drawing apparatus including a bait tube and a bait attached to the lower end of the tube, said bait comprising a hollow body larger than the tube and open at its bottom, the wall of the bait being formed with a relief opening, and a valve controlling passage through said opening, said valve being manually shiftable to a plurality of positions, to thereby variably and controllably relieve air pressure within the bait.

3. A glass drawing apparatus including a bait tube and a bait attached to the lower end of the tube, said bait comprising a hollow body having a diameter larger than the tube and having a plurality of different sized air outlet openings in its wall, and a valve mounted upon the bait manually shiftable to close or disclose any of said openings.

4. A glass drawing apparatus including an imperforate bait tube, a bait into which the lower end of the tube discharges, the bait having a diameter larger than the tube and comprising a hollow body open at its lower end and having a relief opening, and a manually operable valve controlling passage through said opening.

5. A glass drawing apparatus including an imperforate bait tube, a bait carried upon the lower end of the tube and comprising a hollow body open at its lower end, and a valve carried upon the wall of the bait and manually shiftable to a plurality of positions to thereby variably and controllably relieve pressure within the bait.

6. A glass drawing apparatus comprising an imperforate bait tube, a bait attached to the lower end of the tube and comprising a hollow body open at its lower end, and means mounted upon the bait whereby the pressure of air within the bait may be relieved, said means being manually operable to variably control the pressure within the bait.

7. A bait for glass drawing comprising a hollow body open at its lower end, the upper wall of the body having a plurality of sets of air outlet openings, the sets being formed in uniformly spaced relation, each set of openings comprising a plurality of openings of graduated sizes, and an annular manually operable valve mounted upon the body and controlling the passage through said openings and having a perforation for each set of openings adapted to register with the openings in the body when the valve is shifted.

8. A glass drawing apparatus including a bait and a bait tube, means for carrying air under pressure into the bait tube and bait, and manually operable means on the bait for controlling the pressure within the bait.

9. A glass drawing apparatus including a bait and a bait tube, means for carrying air under pressure into the bait tube and bait, and means for controlling the pressure within the bait, including a plurality of uniformly spaced sets of perforations of graduated sizes in the wall of the bait and a manually shiftable valve controlling the escape of air through said perforations.

10. A glass drawing apparatus including a bait, a bait tube operatively connected to a source of air under pressure, means for controlling the volume of air passing through the bait tube, and manually operable means on the bait for controlling the pressure of air in the bait.

11. A glass drawing apparatus including a bait, a bait tube operatively connected to a source of air under pressure, means for automatically controlling the volume of air passing through the bait tube in correspondence with the elongation of the glass cylinder drawn by the bait, and manually controllable means on the bait for controlling the pressure of air therein.

12. A glass drawing apparatus including a bait, a bait tube operatively connected to a source of air under pressure, means for automatically controlling the volume of air passing through the bait tube and bait in correspondence with the elongation of the glass cylinder drawn by the bait, and manually controllable means on the bait permitting the escape of air therefor to thereby control the pressure within the bait.

13. A bait for glass drawing comprising a hollow body, the body being expanded toward its median plane and then contracted downward and centrally to an orifice in its bottom, the orifice being thus less in diameter than the extreme diameter of the body and being defined by a vertical wall, the outer surface of the downwardly contracted portion of the body being straight from the lower corner of the wall of the orifice upward and outward to the point of greatest diameter, whereby the line of contact between the lowest edge of the bait and the molten glass may be observed and whereby the bait will be provided at its lower end with a sharp annular edge.

14. A bait for glass drawing comprising a hollow body, the wall of said body extending outward and downward from a central upper orifice and then extending downward and centrally to a lower orifice, the lower orifice being bounded by a vertical defining wall, the inner face of the lower wall of the bait having an angle to the horizontal greater than the critical angle of friction and said inner face of the lower wall being formed immediately surrounding the orifice with a substantially horizontal shoulder, the under face of the lower wall being extended straight downward and inward and intersecting the vertical wall of the orifice, thereby producing a sharp annular edge at the extreme lower end of the bait.

15. A bait for glass drawing comprising a hollow body, the wall of said body extending outward and downward from a central upper orifice and then extending downward and centrally to a lower orifice, the orifice being bounded by a vertical wall, the inner face of that portion of the wall extending downward and centrally having an angle to the horizontal greater than the critical angle of friction, but said inner wall being formed immediately surrounding the orifice with a shoulder, the upper face of said shoulder extending to the wall of the orifice and being disposed in an angular plane, the outer face of the downwardly converging portion of the wall extending straight upward and outward from the lower corner of the wall surrounding the orifice to the point of greatest diameter of said body and being disposed at an angle to the horizontal sufficient to enable the line of contact between the glass and the orifice wall to be observed at all times and thereby producing a sharp annular edge at the extreme lower end of the bait.

16. A glass drawing apparatus including a bait and bait tube, a pipe delivering air under pressure to the bait tube, a member extending across the pipe and controlling the passage of air through said pipe and having an opening therethrough, said opening having a triangular head and a shaft, relatively narrow at its junction with the head, the apex of the head extending away from the shaft, a valve shifting across said opening, and closing the opening when the bait tube is lowered, and means for shifting said valve to gradually disclose the head of the opening and then the shank of said opening, as the bait tube is raised.

17. A glass drawing apparatus including a bait and a bait tube, means for supplying air to the bait tube, means for raising and lowering the bait tube, a valve normally preventing passage of air through the bait tube, and means for automatically shifting said valve at a uniform speed as the bait is lifted from the molten glass, said valve being formed to permit the passage of a relatively small volume of air to the bait tube when the bait is initially lifted from the molten glass and the valve is initally shifted, increase the volume of air so supplied as the bait is lifted from the glass and the valve is shifted to form the neck of a cylinder, suddenly decrease the rate of increase of said volume of air at the point where the bait tube has been lifted to complete the neck, and then gradualy increase the rate of increase of the volume of air as the bait moves upward to form the body of a cylinder having a uniform diameter, the means for raising the bait tube acting to lift the bait tube at a uniform and relatively slow rate of speed until the neck of the cylinder has been completed, and then lifting the bait tube at a gradual and uniformly increasing speed until the cylinder is completed.

18. Means for controlling the volume of air admitted to the bait pipes of glass drawing apparatus comprising a casing having inlet and outlet ports, a disk rotatably mounted in the casing and having a plurality of different sized apertures, the disk being shiftable to bring any one of said apertures in alinement with said ports, and a valve shiftable across the face of the disk to control the effective area of the aperture formed in said disk.

19. Means for controlling the volume of air admitted to the bait pipes of glass drawing apparatus, comprising a circular casing having a radial extension and being formed with alined outlet and inlet ports, a disk rotatably mounted within said casing and having a series of different sized apertures arranged in circular series and adapted to be brought, one by one, in alinement with said ports, a slide valve mounted in the extension of said casing and adapted to be shifted into position between said ports and over an aperture in alinement therewith, and means for rotating the disk comprising a radial handle on the exterior of the casing operatively connected to the disk, and means for holding the handle in different adjusted positions.

20. A glass drawing apparatus comprising a bait and bait pipe, a vertically movable carriage operatively connected to the bait pipe, a vertical guide for the carriage, a shaft extending transversely across the path of travel of the carriage, a drum mounted upon the shaft to rotate therewith but having longitudinal movement upon the shaft, a cable extending from the carriage and wound upon the drum, means for centering the cable with relation to the carriage comprising a screw carried by the drum, and a fixed nut with which the screw engages, whereby the drum will be shifted along the shaft upon a rotation of the shaft, a pipe delivering air under pressure to the bait pipe, a casing having outlet and inlet ports disposed in the length of said delivery pipe, a member shiftable in said casing and having a series of different sized apertures adapted to be brought each in alinement with the outlet and inlet ports of the casing, a valve mounted in said casing and shiftable across said apertures, and means for shifting the valve to disclose said apertures in proportion to the lifting of the bait comprising a lever operatively connected to the valve at one end and a nut operatively connected to the lever and having screw-threaded engagement with said shaft.

21. Means controlling the volume of air admitted to the bait pipes of glass drawing apparatus, comprising a casing having inlet and outlet ports, a member shiftably mounted in the casing and having a plurality of different sized apertures, the member being shiftable to bring any one of said apertures in alinement with said ports, each of said apertures being formed to provide a substantially triangular head and a shaft portion extending from the base of the triangular head, the shaft portion at its junction with the head being narrower than the base of the head and said shaft portion gradually increasing in width as it extends away from the head, a valve shiftable across the face of the said member to thereby control the effective area of the aperture in alinement with said ports, and means for shifting said valve to gradually disclose the head of the aperture and then the shank thereof as the bait pipe is raised, said valve being automatically shifted to increase the area of the aperture in correspondence with the raising of the pipe.

In testimony whereof we hereunto affix our signatures in the presence of two witnesses.

GEORGE L. CATLIN.
DAVID MORRISON.

Witnesses:
M. N. ALLEN,
RALPH B. CATLIN.